United States Patent
Horimoto

[19]

[11] Patent Number: 6,113,274
[45] Date of Patent: Sep. 5, 2000

[54] LINEAR GUIDEWAY HAVING SPACERS AND SPACER BALL

[75] Inventor: Hidemi Horimoto, Nara, Japan

[73] Assignee: Tsubaki Nakashima Co., Ltd., Hyogo-ken, Japan

[21] Appl. No.: 09/291,959

[22] Filed: Apr. 15, 1999

[51] Int. Cl.$^7$ .................................................. F16C 29/06
[52] U.S. Cl. ............................................. 384/43; 384/521
[58] Field of Search .................................. 384/43, 45, 51, 384/521

[56] References Cited

U.S. PATENT DOCUMENTS

| | | | |
|---|---|---|---|
| 785,663 | 3/1905 | Chapman | 384/521 |
| 1,283,449 | 11/1918 | Astrom | 384/521 |
| 1,375,313 | 4/1921 | Ohlsson | 384/521 |
| 2,221,512 | 11/1940 | Foley | 384/521 |
| 2,723,169 | 11/1955 | Petit | 384/521 |
| 3,053,105 | 9/1962 | Cole | 384/43 X |
| 5,360,271 | 11/1994 | Agari | 384/43 X |
| 5,927,858 | 7/1999 | Agari | 384/45 X |
| 6,012,848 | 1/2000 | Michioka et al. | 384/43 |

FOREIGN PATENT DOCUMENTS

| | | |
|---|---|---|
| 3455 | of 1973 | Japan . |
| 283634 | of 1986 | Japan . |
| 180015 | of 1989 | Japan . |
| 173946 | of 1994 | Japan . |
| 281154 | of 1998 | Japan . |

OTHER PUBLICATIONS

Watabayashi, Eiichi, JIS How to Use Series, Rolling Bearing Manual, 1$^{st}$ Edition, 1$^{st}$ Print, Japan Standard Association, Feb. 20, 1999, pp. 299–301.

*Primary Examiner*—David A. Bucci
*Assistant Examiner*—Colby Hansen
*Attorney, Agent, or Firm*—Howson & Howson

[57] ABSTRACT

Spacers 10 of the same size are each disposed between adjacent ones of balls 6 which are loaded into each of endless circulation paths 8 formed in a carriage 3, and a spacer ball 12 having a diameter slightly smaller than a nominal diameter of each of the balls is disposed in a gap formed between the ball positioned at a start end as a start-end ball 6A and the ball positioned at a terminal end as a terminal-end ball 6B.

Both axial end faces of each spacer 10 are formed as concave faces 20 conforming to the spherical surface of each ball 6 and thus there is no fear of disengagement of the spacers 10 and the balls 6 from each other during rolling of the balls.

8 Claims, 4 Drawing Sheets

LINEAR GUIDEWAY HAVING SPACERS AND SPACER BALL

TECHNICAL FIELD

The present invention relates to a linear guideway for use in a machine tool or an industrial machine for example.

BACKGROUND ART

As an example of a linear motion rolling guide, there is known a "linear guideway" [see, for example, Eiichi Watabayashi, "JIS How to Use Series—Rolling Bearing Manual," 1st Edition, 1st Print, Japan Standard Association (a foundation), (Feb. 20, 1999), pp. 299–301]. The linear guideway is provided with an elongate guide rail having axial ball rolling grooves formed on both side faces of the guide rail, a carriage mounted movably over the guide rail, the carriage having ball rolling grooves formed on inner side faces thereof in an opposed relation to the ball rolling grooves of the guide rail and also having endless circulation paths which include the ball rolling grooves of the carriage, and a plurality of balls adapted to roll in the endless circulation paths of the carriage and bear a load in both ball rolling grooves.

As the balls in the above linear guideway there mainly are used steel balls (JIS B 1501) for a ball bearing which balls are available commercially. However, the following problems have been encountered heretofore:

(1) With rolling of steel balls positioned between the ball rolling grooves of the carriage and the like grooves of the guide rail, which area is a load-bearing area in the endless steel ball circulation paths, adjacent steel balls may sometimes come into contact with each other. Since the steel balls rotate in the same direction, there occur opposite rotations at the portion of strong contact between adjacent steel balls and the resulting force acts to obstruct smooth rolling of each steel ball. Further, a slip force is also generated at the contact portion. If the carriage slides in such a state, each steel ball will repeat slip and rolling, or repeat collision with adjacent steel balls or with the ball rolling grooves, giving rise to a noise or vibration of a relatively high frequency or an early-stage wear, with consequent deterioration of the guiding accuracy and service life required as a linear guideway. Particularly, there is a recent tendency for the linear guideway to be used at a higher speed, and thus the above point has been noted as a problem to be solved.

(2) Even if a predetermined number of steel balls, which number is determined in design, are loaded into each endless circulation path, a gap corresponding to half of a steel ball or one steel ball is formed in the same path, although this depends, for example, on the overall length of the path. Consequently, when a lightly pre-loaded linear guideway is mounted vertically, upper steel balls may drop and strike against lower steel balls and generate an offensive metallic sound. Further, the collision between steel balls may result in formation of very small dents on their spherical surfaces, which dents may impair the guiding accuracy required as a linear guideway. Pre-loading for the linear guideway is usually effected by an oversized ball method.

The following three means have been proposed for solving the above-mentioned problems:

(1) Disposing a rubber or soft plastic spacer ball between adjacent steel balls in each endless circulation path, the spacer ball having a diameter slightly smaller than the diameter of each steel ball, as described in Japanese Published Unexamined Utility Model Application No. 180015/1989.

(2) Disposing a plastic spacer between adjacent steel balls in each endless circulation path, the plastic spacer being smaller than the diameter of each steel ball, as described in Japanese Published Unexamined Patent Application 173946/1994 and 281154/1998.

(3) Using a ball chain to retain steel balls in each endless circulation path, as described in Japanese Published Unexaminer Patent Application No. 52217/1993.

However, even the above three means have involved the following problems:

(1) In the case of using spacer balls, a load carrying capacity of the linear guideway decreases. For example, if the steel ball-spacer ball arranging ratio is set at 1:1, the value of the load carrying capacity of the linear guideway is reduced by half, so the adoption of such spacer balls has actually been impossible.

(2) In the case of using such a spacer as described in the foregoing Japanese Published Unexamined Patent Application No. 173946/1994, it has been impossible to load both steel balls and spacers closely, leaving no space, into each endless circulation path, although this depends on the overall length of the same path and is attributable to a processing error for the spacer thickness. The gap thus formed has sometimes resulted in steel balls coming off concave faces formed at both ends of each spacer, with consequent occurrence of a lock phenomenon. This lock phenomenon has sometimes caused breakage of the spacer.

Steel balls and spacers may be arranged closely without leaving any space by making the spacers different in thickness, as described in the foregoing Japanese Published Unexamined Patent Application No. 281154/1998. However, since plastic spacers are formed by injection molding with use of a mold, the formation of spacers having various thicknesses leads to a considerable increase of cost. Thus, it has so far been difficult to realize such idea.

(3) Using a ball chain

① It is necessary that a recess for receiving connector members of the ball chain therein be formed on an inner wall surface of each endless circulation path, thus requiring an extra cost for machining.

② It is necessary that steel balls be inserted into a mold and be subjected to injection molding integrally with spacers and connector members. However, for obtaining ball chains of desired lengths, it is required to fabricate various long molds to match the diameters of steel balls used. Thus, even a mere fabrication of the molds requires a considerable cost.

③ Linear guideways, even of the same nominal model number, include two types of carriage lengths—standard type and long type—. Therefore, it is necessary to fabricate ball chains of two different lengths.

DISCLOSURE OF THE INVENTION

According to the present invention, for solving the above-mentioned problems, there is provided a linear guideway including an elongate guide rail having axial ball rolling grooves formed on both side faces thereof, a carriage mounted movably over the guide rail, said carriage having ball rolling grooves formed on inner side faces thereof in an opposed relation to the ball rolling grooves of the guide rail and also having endless circulation paths including the ball rolling grooves of the carriage, and a plurality of balls adapted to roll in the endless circulation paths of the carriage and bear a load in both ball rolling grooves, and wherein spacers each having concave faces at both end portions thereof are each disposed between adjacent said balls, said concave faces being in conformity with the spherical surface of each said ball, and a spacer ball having a diameter smaller than a nominal diameter of each said ball is disposed in a gap formed between the ball as a start-end ball and the ball as a terminal-end ball, said gap resulting from the arrangement of the spacers.

The "nominal diameter" indicates a nominal reference size (reference diameter) of ball as is defined by JIS B 1501.

Thus, in the present invention, spacers each having concave faces at both end portions thereof in conformity with the spherical surface of each ball are each disposed between adjacent balls, and a spacer ball having a diameter smaller than the nominal diameter of each ball is disposed in a gap formed between the ball as a start-end ball and the ball as a terminal-end ball, the said gap resulting from the arrangement of the spacers. Consequently, there accrue the following advantages:

① Since the balls do not contact with one another, it is possible to prevent the occurrence of noise and vibration of a relatively high frequency caused by mutual contact of balls or prevent an early-stage wear of the balls and hence possible to maintain the guiding accuracy and service life required as a linear guideway.

② When the linear guideway is mounted vertically in a lightly pre-loaded state, there is no fear that an upper ball may drop and strike against a lower ball. Thus, the generation of an offensive noise caused by collision is prevented. Besides, since a very small dent is not formed on the spherical surface of each ball, it is possible to ensure a stable guiding accuracy required as a linear guideway.

③ Unlike the case where only balls and spacer balls are used, there is no fear of decrease in the load carrying capacity of the linear guideway.

④ Since it is impossible that each ball will become disengaged from the concave faces formed at end portions of adjacent spacers, it is possible to prevent the occurrence of a lock phenomenon and breakage of the spacers caused by such lock phenomenon, thus making it possible to ensure smooth rolling of each ball.

⑤ Since the spacers are independent and not connected with one another, such an extra machining as in the use of a ball chain is not needed for the endless circulation paths of the carriage. Moreover, it is possible to cope with various products without being restricted by the length of the carriage.

EMBODIMENTS

A linear guideway according to an embodiment of the present invention will be described hereinunder with reference to the accompanying drawings.

Figure 1:
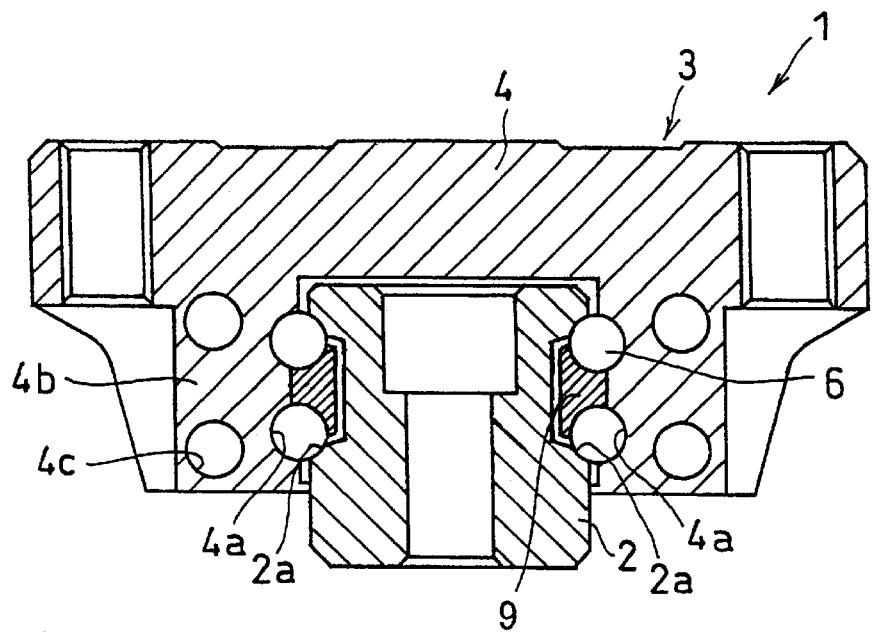
FIG. 1 is a sectional view of a linear guideway.
Figure 2:
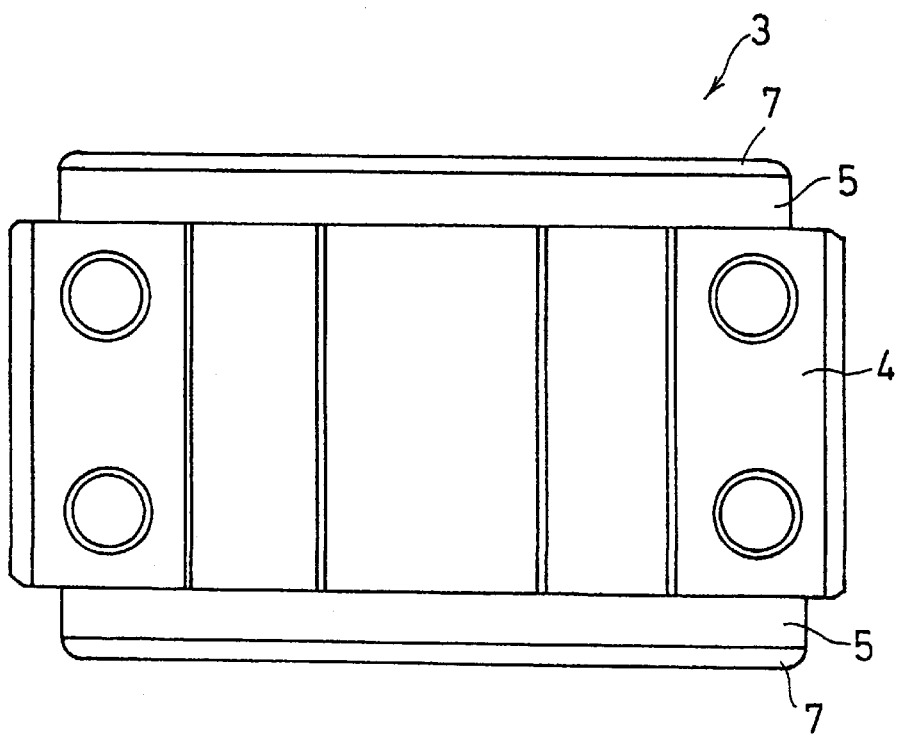
FIG. 2 is a plan view of a carriage shown in FIG. 1.

In FIGS. 1 and 2 there is illustrated an entire structure of a linear guideway 1 which is a so-called end cap type.

The end cap type linear guideway 1 comprises an elongate guide rail 2 having axial ball rolling grooves 2a formed on both side faces thereof, a carriage 3 mounted movably over the guide rail 2, the carriage 3 having ball rolling grooves 4a formed on inner side faces thereof in an opposed relation to the ball rolling grooves 2a and also having endless circulation path 8 which include the ball rolling grooves 4a and the details of which will be described later, and a plurality of balls 6 (mainly steel balls for a ball bearing) adapted to roll in the endless circulation paths 8 of the carriage 3 and bear a load in the ball rolling grooves 2a and 4a. The numeral 9 denotes a ball retainer.

The carriage 3 comprises a carriage body 4 and end caps 5 attached to both ends of the carriage body. On inner side faces of the carriage body 4, as noted above, there are formed ball rolling grooves 4a in an opposed relation to the ball rolling grooves 2a of the guide rail 2. In thick wing portions 4b of the carriage body 4 are formed ball inserting through holes 4c as ball return passages parallel to the ball rolling grooves 4a. In the backs of the end caps 5 are formed semicircular grooves (not shown) which provide communication between the ball rolling grooves 4a and the ball inserting holes 4c both formed in the carriage body 4 and which thereby cause the balls to change their moving direction. These ball rolling grooves 4a, ball inserting holes 4c and semicircular groove conjointly form the endless circulation paths 8 of balls 6. Numeral 7 denotes a side seal attached to the outer surface of each end cap 5.

Figure 3:
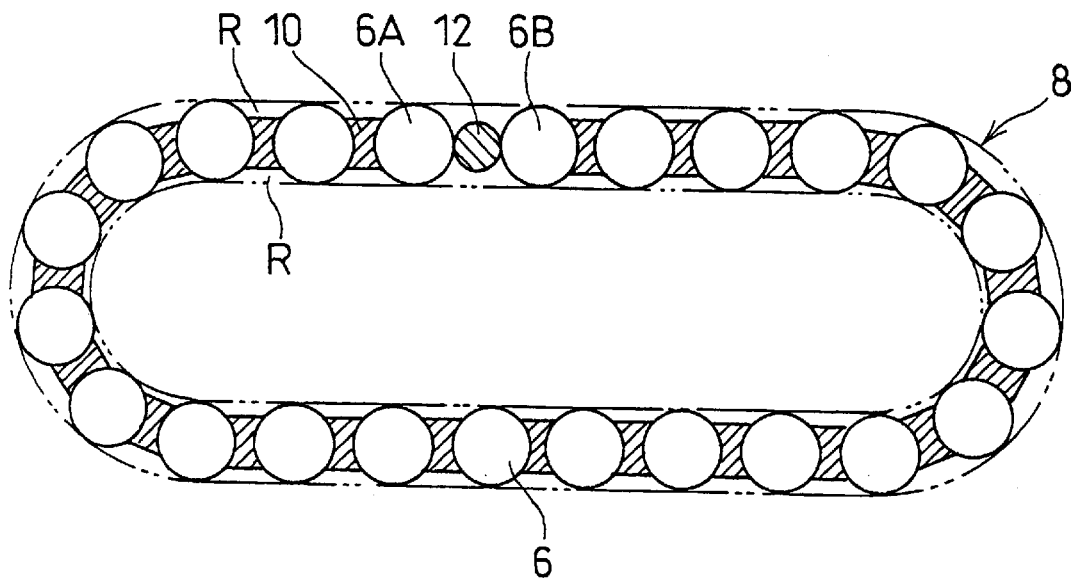
FIG. 3 is a schematic diagram showing balls, spacers and a spacer ball which are loaded into an endless circulation path.

FIG. 3 shows balls 6, spacers 10 and a spacer ball 12 as loaded into an endless circulation path 8. To be more specific, cylindrical spacers 10 formed, for example, of a metal or a plastic material are each disposed between adjacent balls 6, and a spacer ball 12 having a diameter slightly smaller than the nominal diameter of each ball 6 is disposed in a gap formed between a start-end ball 6A and a terminal-end ball 6B.

In FIG. 3 the spacer ball 12 is drawn fairly small in comparison with the diameter of each ball 6 for the convenience of explanation. As will be described later, a suitable numerical value of the gap between the start- and terminal-end balls is determined in such a manner that the diameter of the spacer ball 12 is slightly smaller than the diameter of each ball 6.

Figure 4:
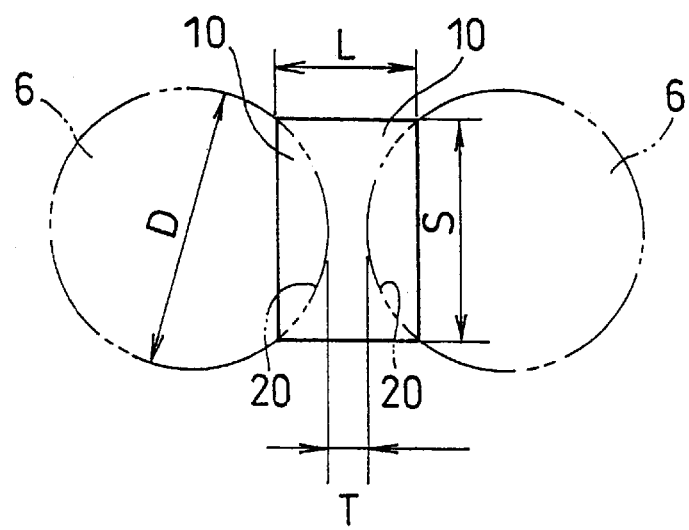
FIG. 4 is a side view of a spacer.

The following description is now provided about the structure of each spacer 10:

As shown in FIG. 4, concave faces 20 conforming to the spherical surface of each ball 6 are formed at both axial end faces of each spacer 10, and adjacent balls 6 are slidably fitted in the concave faces 20 respectively.

Figure 5:
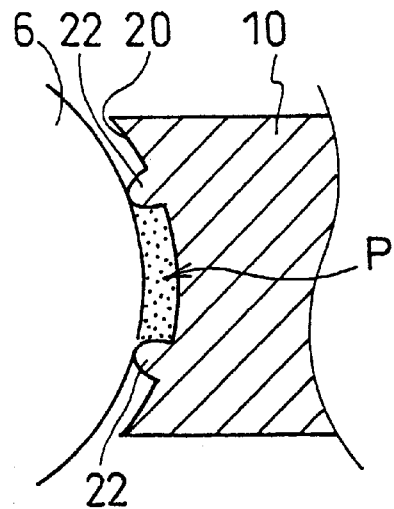
FIG. 5 is a partially enlarged sectional view of the spacer shown in FIG. 4.

As shown on a partially enlarged scale in FIG. 5, a plurality of protuberances 22 for forming a crater-like oil pocket P are formed on each concave face 20 of the spacer 10. With a lubricant (grease or oil) staying in the oil pocket P, a friction induced by sliding contact of the ball surface with the protuberances 22 is diminished and the lubricant which has been transferred onto the spherical surface of the ball 6 prevails throughout the whole of the endless circulation path 8.

Figure 6:
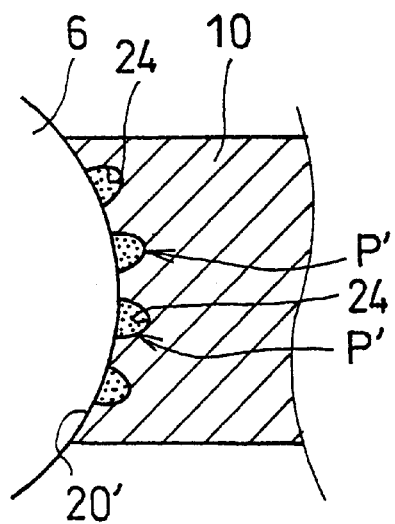
FIG. 6 is a partially enlarged sectional view showing a second example of a spacer.

FIG. 6 is a partially enlarged diagram showing a second example of a spacer 10. In this spacer 10, a plurality of relatively small depressions 24 are formed on a concave face 20' which is formed at each of both axial end faces of the spacer and which conforms to the spherical surface of each ball 6 as a whole. The depressions 24 function as oil pockets P'.

Figure 7:
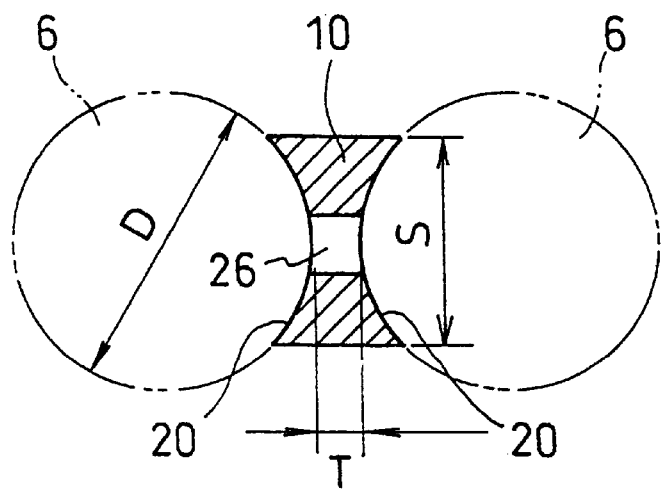
FIG. 7 is an axial sectional view showing a third example of a spacer.

FIG. 7 is an axial sectional view showing a third example of a spacer 10. In this spacer 10, no oil pocket is formed on a concave face 20, but a through hole 26 is formed axially centrally. Lubricant stays in the through hole 26, which thus functions as an oil pocket.

Lubricant is retained not only in oil pockets formed on the concave faces of the spacers but also in spaces R formed between the outer peripheral surfaces of the spacers 10 and the inner wall of the endless circulation path 8 (see FIG. 3). Consequently, the lubricant holding capability is improved and the supply of lubricant is not needed over a long period, that is, it becomes possible for the linear guideway to be maintenance-free over a longer period.

Although in the above three examples of spacers an oil pocket or oil pockets are formed on the concave surface of each spacer, the spacer, without forming such oil pocket(s), may be formed using an oil-retaining sintered alloy or Teflon (tetrafluoroethylene) which are known as self-lubricating materials. In this case, lubrication is performed naturally by sliding contact of the balls 6 with the concave faces of the spacers 10, thus eliminating the need of any special processing for the concave faces of the spacers.

Further, the spacers 10 may also be formed using a lubricant-containing plastic material or a porous plastic material capable of being impregnated with a lubricant. Also in this case it is not necessary to apply any special processing to the concave faces of the spacers. Such lubricant-containing plastic material and porous plastic material capable of being impregnated with a lubricant are well known as described respectively in Japanese Japanese Published Examined Patent Application No. 3455/1973 and Unexamined Patent Application No. 283634/1986 and do not constitute the subject matter of the present invention, so explanations thereof will be omitted.

A description will now be given of the diameter S of each spacer 10 and thickness T thereof which determines the spacing between adjacent balls 6.

It is desirable that the diameter S of each of the above three examples of spacers 10 be set at a value corresponding to 60% to 80% of the nominal diameter D of each ball 6. This is for the following reasons:

(1) If the thickness T of each spacer 10 is too small, the area for holding balls 6 becomes narrow and in the worst case the spacer comes off the balls.

(2) From the standpoint of spacer holding stability by the balls 6 and strength, the larger the diameter of each spacer 10, the more desirable.

(3) In view of the point that the balls 6 and the spacers 10 should circulate smoothly in the direction changing path (the semicircular grooves in each end cap 5), the diameter of each spacer 10 is restricted.

It is preferable that the thickness T of each spacer which determines the spacing between adjacent balls 6, namely, the distance between opposed apexes of adjacent balls 6 adjacent to each other through the spacer 10, with no consideration given to the presence of lubricant, be set at a value of 0.1 to 0.3 mm from the following standpoints.

(1) As many balls 6 as possible should be loaded into each endless circulation path to ensure a required load carrying capacity.

(2) Balls 6 and spacers 10 should circulate smoothly within the direction changing path.

Figure 8:
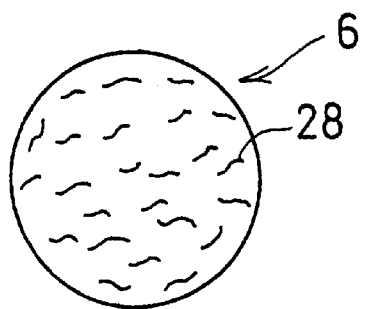
FIG. 8 is a front view showing a second example of a ball.

As the balls 6, commercially available steel balls for a ball bearing are mainly used in the present invention. Using a grindstone of #2000 to #6000, a large number of fine needle-like recesses 28 may be formed randomly on the spherical surface of each ball 6, as shown in FIG. 8. The fine needle-like recesses 28 function as oil pockets for lubricant, so that during rolling of the balls 6, the lubricant continues to be transferred into each ball rolling groove 2a of the guide rail 2 and each ball rolling groove 4a of the carriage 3. Consequently, it is possible to prevent the breakage of oil film between the balls 6 and the ball rolling grooves 2a, 4a and hence possible to afford a linear guideway of a longer service life.

Reference will now be made to the spacer ball 12. As noted previously, the spacer ball 12 having a diameter smaller than the nominal diameter D of each ball 6 is disposed in the gap between the start-end ball 6A and the terminal-end ball 6B in each endless circulation path 8. If the diameter of the spacer ball 12 is too small, the spacer ball may come off the ball retainer 8 of the carriage, or it may be engaged with the ball 6A or 6B and obstruct smooth circulation of the balls 6. In view of this point it is desirable to use a spacer ball having a diameter 20 to 400 μm smaller than the nominal diameter D of each ball 6.

As the spacer ball 12, like the balls 6, there may be used a commercially available steel ball. But it is desirable to use a ball of an elastic material such as rubber or a soft plastic material. This is because from the standpoint of the rolling life of steel balls it is better to bring steel balls into contact with an elastic ball rather than contact between steel balls.

Now, a description will be given of how to load the balls 6, spacers 10 and spacer ball 12 into each endless circulation path 8.

First, the balls 6 and the spacers 10 are loaded alternately into the endless circulation path 8 and then the spacer ball of a diameter corresponding to the size of the resulting gap is loaded into the gap to minimize the gap. The size of the resulting gap can be estimated roughly from the overall length of the endless circulation path 8 and the nominal diameter of each ball 6 and therefore a spacer ball 12 of an appropriate diameter can be provided in advance.

For ease of understanding, concrete numerical values will be mentioned below.

For example, in the case of a standard type of nominal model number H35, thirty steel balls each having a nominal diameter of ¼ inch (6.35 mm) are loaded into one endless circulation path and the size of the resulting gap is about 5.3 mm.

In the case where spacers each having a diameter S of 5 mm and a thickness T of 0.2 mm (length L=2.2 mm) are each disposed between adjacent steel balls, twenty-nine steel balls and twenty-eight spacers can be loaded into the endless circulation path and the size of the resulting gap is 6.05 mm. If a commercially available steel ball 6 mm in diameter is inserted into this gap, the spacers will circulate smoothly without disengagement from steel balls. Although the load carrying capacity decreases by an amount corresponding to only one steel ball, there is no problem in practical use.

ADVANTAGES OF THE INVENTION

According to the Present Invention:

(1) Since balls do not contact with one another, it is possible to prevent the occurrence of noise and vibration of a relatively high frequency caused by mutual contact of balls or prevent an early-stage of wear of the balls and hence possible to maintain the guiding accuracy and service life required as a linear guideway.

(2) When the linear guideway is mounted vertically in a lightly pre-loaded state, there is no fear that upper balls may drop and strike against a lower ball. Thus, the generation of an offensive noise caused by collision is prevented. Besides, since a very small dent is not formed on the spherical surface of each ball, it is possible to ensure a stable guiding accuracy required as a linear guideway.

(3) Unlike the case where only balls and spacer balls are used, there is no fear of decrease in the load carrying capacity of the linear guideway.

(4) Since it is impossible that each ball will become disengaged from the concave faces formed at end portions of adjacent spacers, it is possible to prevent the occurrence of a lock phenomenon and breakage of the spacers caused by such lock phenomenon, thus making it possible to ensure smooth rolling of each ball.

(5) Since the spacers are independent and not connected with one another, such an extra machining as in the use of a ballchain is not needed for the endless circulation paths of the carriage. Moreover, it is possible to cope with various products without being restricted by the length of the carriage.

(6) By forming an oil pocket or oil pockets on each concave face of each spacer or axially centrally of each spacer and/or on the surface of each ball, the lubricant which has been transferred onto the spherical surface of each ball extends throughout the whole of the associated endless circulation path as the ball rolls. Besides, it is possible to prevent the breakage of oil film formed between the spherical ball surfaces and the associated ball rolling groove, thus making it possible to afford a linear guideway of a longerer life.

(7) Since the lubricant is retained not only in the oil pocket(s) but also in the spaces formed between the outer peripheral surfaces of the spacers and the inner wall of the endless circulation path, the supply of lubricant is not needed over a long period, that is, it becomes possible for the linear guideway to be maintenance-free over a longer period.

(8) If the spacer thickness is set at a value of 0.1 to 0.3 mm, a large number of balls can be loaded into each endless circulation path and hence it is possible to ensure the required load carrying capacity.

(9) If each spacer is formed using a self-lubricating material or a lubricant-containing or—impregnated plastic material, it is not necessary to perform any special processing for the concave faces of the spacer.

(10) If there is used a spacer ball whose diameter is 20 to 400 $\mu$m smaller than the nominal ball diameter, there is no fear that the spacer ball may come off the carriage or smooth circulation of balls may be obstructed.

(11) If a spacer ball formed of an elastic material is used, it is possible to prolong the rolling life of steel balls.

(12) Since the spacer ball is used, it is not necessary to provide spacers of different sizes.

What is claimed is:

1. A linear guideway including:

an elongate guide rail having axial rolling grooves formed on both side faces thereof; and a carriage mounted movably over said guide rail, said carriage having ball rolling grooves formed on inner side faces thereof in an opposed relation to the ball rolling grooves of said guide rail and also having endless circulation paths including the ball rolling grooves of said carriage; and a plurality of load-bearing balls adapted to roll in said endless circulation paths of said carriage and bear a load in both said ball rolling grooves;

wherein spacers each having concave faces at both end portions thereof are each disposed between adjacent said load-bearing balls, said concave faces being in conformity with the spherical surface of each said load-bearing ball, and having only a single spacer ball disposed in a gap formed between one of said plurality of load-bearing balls designated as a start-end ball and one of said plurality of load-bearing balls designated as a terminal-end ball, said spacer ball having a diameter smaller than a nominal diameter of each of said load-bearing balls.

2. A linear guideway according to claim 1, wherein an oil pocket is formed on each said concave face of each said spacer.

3. A linear guideway according to claim 1, wherein said spacers are each cylindrical or disc-shaped, and the diameter of each said spacer is 60% to 80% of the nominal diameter of each said load-bearing ball.

4. A linear guideway according to claim 1, wherein the spacing between opposed apexes of adjacent said load-bearing balls adjacent to each other through each said spacer is in the range of 0.1 to 0.3 mm.

5. A linear guideway according to claim 1, wherein said spacers are each formed using a self-lubricating material or a lubricant-containing or -impregnated plastic material.

6. A linear guideway according to claim 1, wherein a plurality of recesses are formed randomly on the surface of each said load-bearing ball.

7. A linear guideway according to claim 1, wherein the diameter of said spacer ball is 20 to 40 $\mu$m smaller than the nominal diameter of each said load-bearing ball.

8. A linear guideway according to claim 1, wherein said spacer ball is formed of an elastic material.

* * * * *